(12) United States Patent
Schaefer

(10) Patent No.: US 7,123,351 B1
(45) Date of Patent: Oct. 17, 2006

(54) METHOD AND APPARATUS FOR MEASURING DISTANCES USING LIGHT

(76) Inventor: Philip R. Schaefer, 88 High Country Rd., Weaverville, NC (US) 28787

( * ) Notice: Subject to any disclaimer, the term of this patent is extended or adjusted under 35 U.S.C. 154(b) by 0 days.

(21) Appl. No.: 11/267,234

(22) Filed: Nov. 3, 2005

Related U.S. Application Data

(63) Continuation-in-part of application No. 10/641,850, filed on Aug. 15, 2003.

(60) Provisional application No. 60/405,079, filed on Aug. 20, 2002, provisional application No. 60/625,035, filed on Nov. 3, 2004.

(51) Int. Cl.
G01C 3/08 (2006.01)
G01C 3/00 (2006.01)

(52) U.S. Cl. .................. 356/4.07; 356/3.1

(58) Field of Classification Search .......... 356/3.01, 356/3.08, 3.1, 4.01, 4.07, 620, 622, 623; 342/119, 141
See application file for complete search history.

(56) References Cited

U.S. PATENT DOCUMENTS

| | | | |
|---|---|---|---|
| 4,716,430 A | 12/1987 | Stauffer | |
| 4,752,799 A | 6/1988 | Stauffer | |
| 4,988,981 A * | 1/1991 | Zimmerman et al. | 345/158 |
| 5,149,952 A | 9/1992 | Tanaka et al. | |
| 5,229,829 A | 7/1993 | Nihei et al. | |
| 5,532,813 A | 7/1996 | Ohishi et al. | |
| 5,541,723 A | 7/1996 | Tanaka | |
| 5,686,942 A * | 11/1997 | Ball | 345/158 |
| 5,701,006 A | 12/1997 | Schaefer | |
| 5,865,443 A | 2/1999 | Abe | |
| 5,963,309 A | 10/1999 | Nakanishi et al. | |
| 6,172,375 B1 | 1/2001 | Kindaichi | |
| 6,611,741 B1 * | 8/2003 | Michi et al. | 701/29 |
| 2002/0166885 A1 * | 11/2002 | Sugawara | 228/103 |
| 2003/0128153 A1 * | 7/2003 | Paradie et al. | 342/70 |
| 2003/0174054 A1 * | 9/2003 | Shimomura | 340/435 |
| 2006/0120595 A1 * | 6/2006 | Nakamura et al. | 382/154 |

FOREIGN PATENT DOCUMENTS

JP 56033509 A * 4/1981 .................. 356/3

OTHER PUBLICATIONS

Foley, James D.; Chapter 16 Shading Models "Fundamentals of Interactive Computer Graphics" Copyright 1982; pp. 575-580; Addison-Wesley Publishing Company, Inc.

* cited by examiner

Primary Examiner—Thomas H. Tarcza
Assistant Examiner—Isam Alsomiri
(74) Attorney, Agent, or Firm—John D. Lister

(57) ABSTRACT

A method and device for measuring a distance to an object with light determines the distance by measuring the relative intensity of light reflected from the object and traveling over two or more paths of differing optical length or reflected from the object and traveling over two or more paths through the use of the offset angle effect. Light is emitted by one or more light sources; reflected from a surface of the object; and the reflected light is detected by one or more light detectors. The light detector(s) generate signals based on the intensity of reflected light detected and the signals are utilized to calculate the distance from the device to the object.

21 Claims, 13 Drawing Sheets

METHOD AND APPARATUS FOR MEASURING DISTANCES USING LIGHT

CROSS-REFERENCE TO RELATED APPLICATIONS

This patent application is a continuation-in-part of copending U.S. patent application Ser. No. 10/641,850 filed Aug. 15, 2003, which prior application claimed the priority and benefit of U.S. Provisional Application No. 60/405,079, filed Aug. 20, 2002. This patent application also claims the priority and benefit of copending U.S. Provisional Application No. 60/625,035, filed Nov. 3, 2004, which is incorporated herein in its entirety by reference.

GOVERNMENT LICENSE RIGHTS

This invention was made with United States government support under one or more SBIR grants from the National Institutes of Health. The United States government has certain rights in this invention.

BACKGROUND OF THE INVENTION

The present invention relates to a method and device for measuring a distance from the device to an object using light, and, more specifically, to a method and device for measuring a distance from the device to an object wherein light is emitted from one or more light sources of the device and reflected from a surface of the object to one or more light detectors of the device. In some embodiments of the present invention, the light travels over paths of differing length between the light source(s), the object reflecting the light, and the light detector(s) and the light intensity measured by the light detector(s) generates electrical signals that are used to calculate the distance from the device to the object. In other embodiments of the present invention, the light travels over paths between the light source(s), the object reflecting the light, and the light detector(s) and the light intensity measured by the light detector(s) generates electrical signals that are used in connection with the offset angle effect to calculate the distance from the device to the object.

There are various applications in which it is desirable to use light to measure distances. Examples of such applications include measuring a distance between a camera and a subject for auto focusing, measuring distances during surveying, measuring astronomical distances, etc. Correspondingly, a variety of methods that use light for measuring distances have been described. One method for measuring distances with light is to measure the time for a light pulse to travel between two points. For example, U.S. Pat. No. 5,532,813, Ohishi et al, discloses a method for measuring distances using lasers wherein a distance measuring means calculates relatively long distances, e.g. kilometers in distance, to a target based on the time difference between a light beam emission and the reception of a return light beam from the target. However, the lasers and optics in such approaches are too complex and expensive for budget limited or highly miniaturized applications. Other, lower cost methods for the time of flight measurement of distances have been described. For example, U.S. Pat. No. 5,701,006, Schaefer, discloses a method for measuring distances in which Light Emitting Diodes (LEDs) and photosensitive diodes are used in fiber optics, and modulation frequencies in the MHz range are used to measure time delays. Although such approaches use lower-cost LEDs and photosensitive diodes, relatively short, properly shaped pulses are required. Electronics in the radio frequency range must also be used to process the signals. These factors introduce higher levels of noise into the overall system, thus relatively complex electronics circuitry or specialized, high power pulse generation at the LED is needed.

For applications such as camera focusing, it is common to transmit a light spot with an LED, then receive an image of the spot at the receiver. By measuring the location of the spot on the received image, the distance to the subject can be determined by triangulation. The basic approach is subject to problems with range and reliability, and various improvements have been described in the following patents. For example, U.S. Pat. No. 5,541,723, Tanaka, discloses a method of measuring distances that involves the transmission at different angles of two differing light distributions. In this method, the information on the amount of signals received tells how much signal does not impinge on the object of interest. Nakanishi, et al., in U.S. Pat. No. 5,963,309, shows multiple LEDs and photosensitive diodes that are used to increase the range and resolution. Kindaichi, in U.S. Pat. No. 6,172,375, uses two spaced lens that form images. From these images, positions are measured and calculated for the purpose of increasing the reliability of measurements. However, these approaches still require the use of lenses in order to obtain images of light spots or patterns. The need for lenses increases the bulk as well as the cost of a distance measuring system.

OBJECTS AND ADVANTAGES OF THE PRESENT INVENTION

Therefore, several objects and advantages of the present invention are:

(a) to provide a system for measuring distances with light,
(b) to provide distance measurement without the need for lenses, enabling an optics measurement system using only Light Emitting Diodes (LEDs) and photodiodes in the optics,
(c) to provide this feature without the need to measure the position of received light on an image,
(d) to provide a system that can perform distance measurements rapidly, and
(e) to provide a system to obtain images of distance data.

Still further objects and advantages of the present invention will become apparent from a consideration of the ensuing description and drawings.

SUMMARY OF THE INVENTION

The present invention is a system for measuring the distance to an object, using light. The light intensity over multiple paths is measured and the relative light intensity from the paths is used to calculate the distance to the object. In some embodiments of the present invention, the light travels over paths of differing length between the light source(s), the object reflecting the light, and the light detector(s) and the light intensity measured by the light detector(s) generates electrical signals that are used to calculate the distance from the device to the object. In other embodiments of the present invention, the light travels over paths between the light source(s), the object reflecting the light, and the light detector(s) and the light intensity measured by the light detector(s) generates electrical signals that are used in connection with the offset angle effect to calculate the distance from the device to the object.

In one embodiment of the present invention, two or more light sources and one light detector are used. Light is sequentially transmitted from each source, and received at the light detector. In another embodiment of the present invention, one light source and two or more light detectors are used. Light is simultaneously received at both light detectors.

In another embodiment of the present invention, light is sequentially transmitted from two or more light sources, and an imaging device, such as a digital camera, is used to provide an array of distances containing distance information in each pixel.

While the distance measuring systems of the present invention may be used to measure various distances from distances less than 10 centimeters in length to distances up to or greater than 5 meters in length, the distance measuring system of the present invention provides an inexpensive, noncomplex, easy to use, distance measuring system that is particularly well suited for measuring and/or monitoring distances to an object wherein the distance from the distance measuring system to the object ranges from about 10 centimeters to about 5 meters. Over this preferred measurement range, the distance measuring system of the present invention has an accuracy of about ±10%.

DESCRIPTION OF THE PREFERRED EMBODIMENTS

Figure 1:
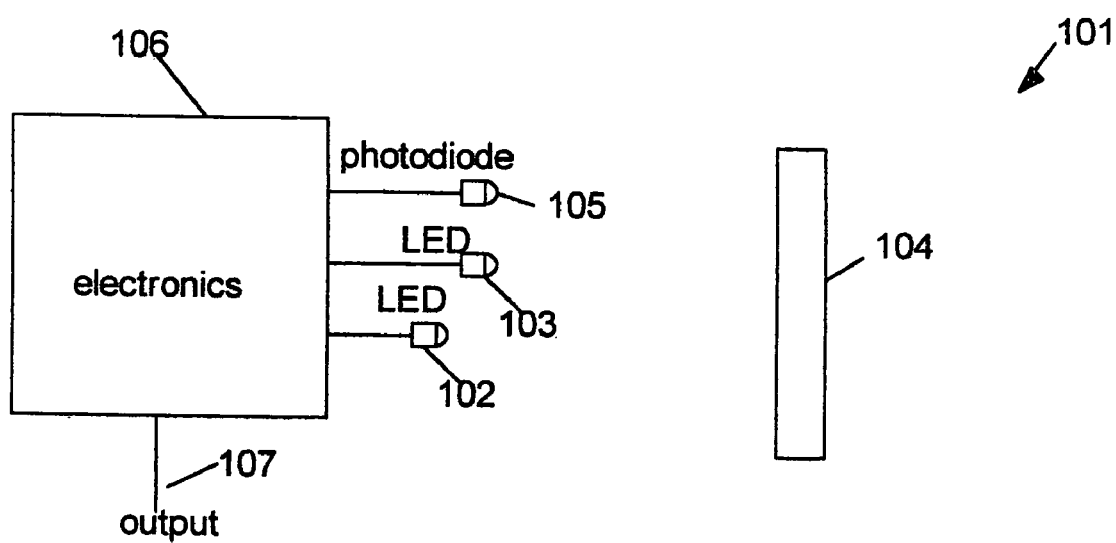
FIG. 1 is a block diagram of a preferred embodiment of the distance measuring system of the present invention.

FIG. 1 is a block diagram of a preferred embodiment of a distance measuring system 101 of the present invention, in which a "far" light source 102 and a "near" light source 103 are located at different distances from an object 104. Preferably, the light sources 102 and 103 have equal intensities and are LEDs (light-emitting diodes). Electronics 106 provides driving signals to sequentially illuminate the light source 102 and the light source 103. A light detector 105, preferably a photodiode, sequentially receives light from the light source 102 and the light source 103 that is reflected from the object 104. Preferably, the light sources 102 and 103 and the light detector 105 are located adjacent each other and contained in a single device. While for certain applications the light sources 102 and 103 need only be sequentially illuminated once, for other applications the light sources 102 and 103 are repeatedly illuminated sequentially for a selected period of time to obtain a distance measurement or distance measurements between the device housing the light sources and light detector and an object. Typically, the near light source 103 of the system 101 is from 2 to 10 centimeters closer to the object 104 than the far light source 102. Preferably, the light sources 102 and 103 and the light detector 105 are located and oriented relative to each other so that the light beams emitted by the light sources 102 and 103 and the resulting light beams from the object 104 that are detected by the light detector 105 are substantially collinear over a distance measuring range selected for the system. The emitted light beams and the reflected light beams detected by the system are separated preferably by 10 centimeters or less, more preferably by 5 centimeters or less, and most preferably by 2 centimeters or less over the selected distance measuring range. With this arrangement of the light sources 102 and 103 and the light detector 105, within the distance measuring range of the system, the light beams emitted by the light sources 102 and 103 and the resulting light beams reflected off of the object 105 and detected by the light detector 105 are reflected from the same or substantially the same common area of the object's surface. Typically, the light sources 102 and 103 and the light detector 105 are located immediately adjacent each other and oriented relative to each other so that the light beams emitted by the light sources 102 and 103 to be reflected from an object within the distance measuring range of the system and the light beams reflected from the object within the distance measuring range of the system and detected by the light detector 105 are substantially collinear or substantially collinear and intersect at a common point that is located in front of the system a distance that is from about half of the maximum selected distance of the measuring range to about the selected maximum distance of the measuring range for the system. In a typical distance measuring device utilizing the system 101, the system 101 of the device may be set up as follows: first, a preferred distance measuring range for the system is selected, e.g. a range from about 10 centimeters to about 5 meters, and second, the light sources 102 and 103 and the light detector 105 are then located immediately adjacent each other and oriented so that (i) the light sources 102 and 103 and the light detector 105 are each aimed at a common point a selected distance in front of the device, e.g. the detectors are aimed at a common point between about 2.5 and about 5 meters in front of the device, and (ii) the emitted light beams from the light sources 102 and 103 and the reflected light beams reflected from an object 104 within the distance measuring range of the system and detected by the light detector 105 are substantially collinear. With this arrangement, over a major portion of the measurement range, the light emitted by the light sources 102 and 103, reflected by the object 104, and detected by the light detector 105 will be reflected from the same or substantially the same area of the reflecting surface of the object 104.

If the object 104 is relatively near the light sources 102 and 103, for example, a distance that is five times the direct (straight line) distance between light source 102 and light source 103, the intensity of light received at the light detector 105 when the light source 103 is on will be significantly larger than the intensity of light received at the light detector 105 when the light source 102 is on. If, however, the object 104 is relatively far from the light sources 102 and 103, the intensity of light received at the light detector 105 when the light source 103 is on will be approximately equal to the intensity received at the light detector 105 when the light source 102 is on. Thus, the electronics 106, which is also connected to the light detector 105, can compute a direct (straight line) distance value from the light source 103 to the object 104 by using the relationship between the two intensities of reflected light input to the light detector 105 from the light emitted by the light sources 102 and 103 and reflected back to the light detector 105 by the object 104. The above relationship in intensifies is true regardless of the reflectivity of object 104. Thus, when using light to measure the distance to an object, the present invention provides a way to cancel out the adverse affect that an object's reflectivity may have on the accuracy of such a distance measurement. Likewise, if the surface of the object 104 reflecting the light from the light sources 102 and 103 is not oriented perpendicularly to the direction of the light emitted from the light sources 102 and 103, the change in received intensity of reflected light by the detector 105 from the object 104 due to the surface angle of the object 104 will be substantially equal for the light sources 102 and 103. Thus, when using light to measure the distance to an object, the present invention also provides a way to cancel out the adverse affect that an object's surface angle may have on the accuracy of such a distance measurement. Furthermore, if the object 104 is of complex shape, the object 104 can be thought of as a collection of tiny surfaces. The superposition of these tiny surfaces will thus provide a way to cancel out the affect of shape when measuring distances using light.

Preferably, the light sources 102 and 103 illuminate an area larger than the area over which the light detector 105 is sensitive. This is preferable so that if the reflecting surface of the object 104 is near the edge of the area illuminated by either light source 102 or 103 and an equal area of the reflecting surface is thereby not illuminated by both of the light sources 102 and 103, significant errors in the distance measurement will not be caused. As discussed above, for the purposes of simplicity, the light sources 102 and 103 of the distance measuring system 101 are of equal intensity. However, provided the relative intensities of the light sources 102 and 103 are known, the electronics 106 can be set up to compute the direct distance from the light source 103 to an object 104 utilizing light sources 102 and 103 of different intensities. While, the distance measured for the distance measurement of the system 101 has been the distance from the near light source 103 to the object 104, electronics 106 may be set up to measure the distance from the far light source 102 or the light detector 105. Since the distances of the light sources 102 and 103 and the light detector 105 to the object 104 typically vary no more than 2 to 10 centimeters, either of the light sources or the light detector may be used to define the distance from the device embodying the system 101 to the object 104 without substantially affecting the accuracy of the system.

Figure 2:
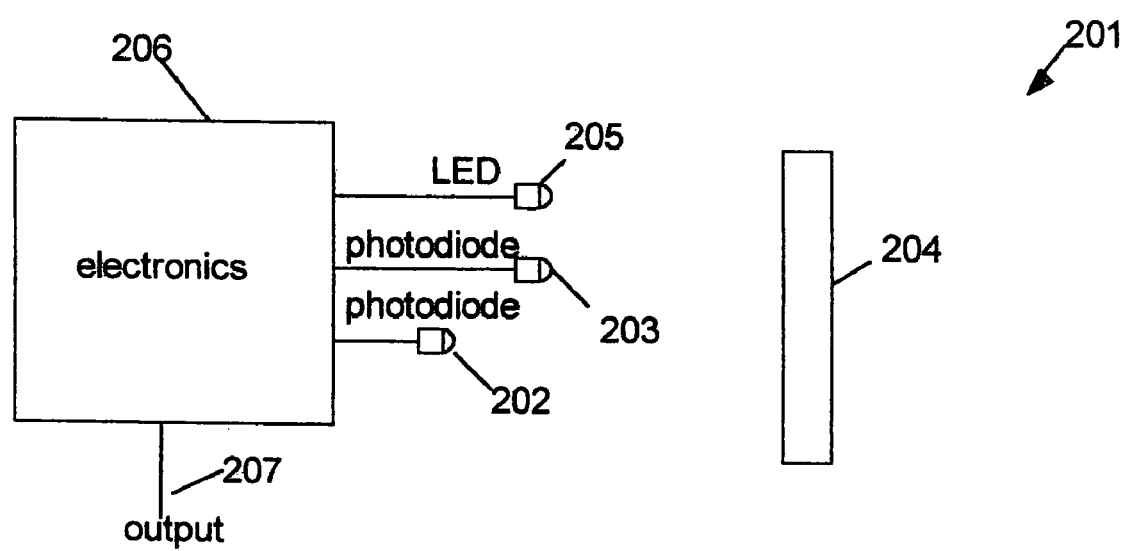
FIG. 2 shows a diagram of an alternate embodiment of the distance measuring system of the present invention.

FIG. 2 shows a diagram of an alternate embodiment 201 of the distance measuring system of the present invention. In this embodiment, a single light source 205 is used to illuminate an object 204. Two light detectors 202 and 203, preferably photodiodes, are located at different direct (straight line) distances from the object 204. Preferably, the light detectors 202 and 203 and the light source 205 are located adjacent each other and contained in a single unit. Typically, the near light detector 203 is from 2 to 10 centimeters closer to the object 204 than the far light detector 202. Preferably, the light detectors 202 and 203 are located and oriented relative to each other and the light source 205 so that the light beam emitted by the light source 205 and the resulting reflected light beams from the object 204 detected by the light detectors 202 and 203 are substantially collinear over a distance measuring range selected for the system. The emitted light beams and the reflected light beams detected by the system are separated preferably by 10 centimeters or less, more preferably by 5 centimeters or less, and most preferably by 2 centimeters or less over the selected distance measuring range. With this arrangement of the light detectors 202 and 203 and the light source 205, within the distance measuring range of the system, the light beam emitted by the light source 205 and the resulting light beams reflected off of the object 205 and detected by the light detectors 202 and 203 are reflected from the same or substantially the same common area of the object's surface. Typically, the light source 205 and the light detectors 202 and 203 are located immediately adjacent each other and oriented relative to each other so that the light beam emitted by the light source 205 to be reflected from an object within the distance measuring range of the system and the light beams reflected from the object within the distance measuring range of the system and detected by the light detectors 202 and 203 are substantially collinear or substantially collinear and intersect at a common point that is located in front of the system a distance that is from about half of the maximum selected distance of the measuring range to about the selected maximum distance of the measuring range for the system. In a typical distance measuring device utilizing the system 201, the system 201 of the device may be set up as follows: first, a preferred distance measuring range for the system is selected, e.g. a range from about 10 centimeters to about 5 meters, and second, the light detectors 202 and 203 and the light source 205 are then located immediately adjacent each other and oriented so that (i) the light detectors 202 and 203 and the light source 205 are each aimed at a common point a selected distance in front of the device, e.g. the detectors are aimed at a common point between about 2.5 and about 5 meters in front of the device, and (ii) the emitted light beam from the light source 205 and the reflected light beams reflected from an object 204 within the distance measuring range of the system and detected by the light detectors 202 and 203 are substantially collinear. With this arrangement, over a major portion of the measurement range, the light emitted by the light source 205, reflected by the object 204, and detected by the light detectors 202 and 203 will be reflected from the same or substantially the same area of the reflecting surface of the object 204.

Electronics 206 uses the signals generated by the received intensities from light detectors 202 and 203 to compute the distance from a device embodying the system 201 to the object 204. This is analogous to the way the two sequentially measured intensities from light detector 105 are used in system 101, above, to measure the direct distance from a device embodying the system 101 to the object 104.

Preferably, the light detectors 202 and 203 are sensitive to light over a larger area than is illuminated by the light source 205. This is preferable so that if object 204 is near the edge of the area detected by either light detector and an equal area of the reflecting surface is thereby not detected by both of the light detectors 202 and 203, significant errors in the distance measurement will not be caused.

Figure 3:
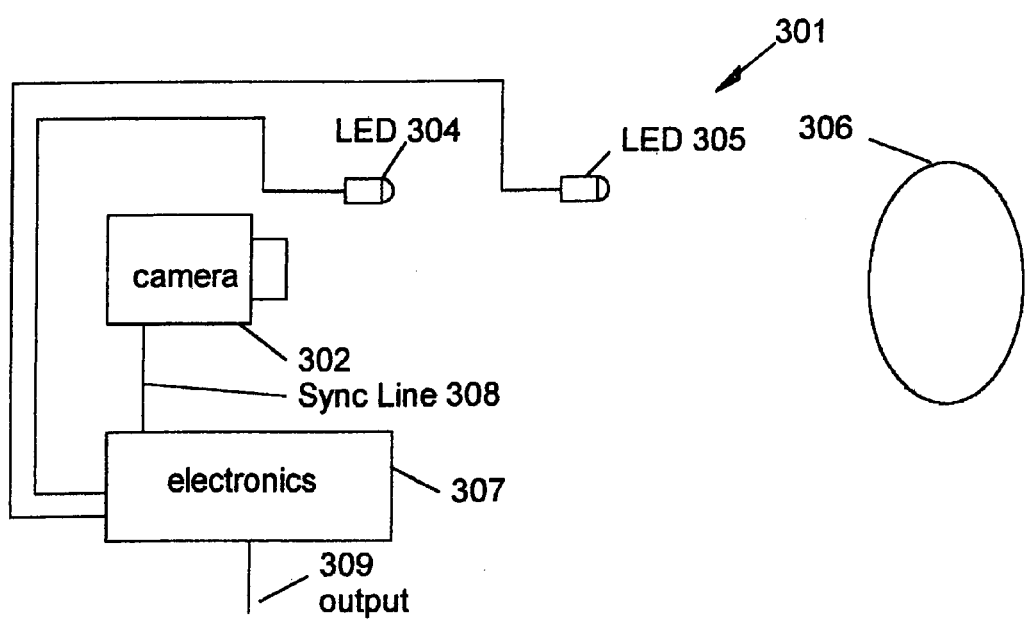
FIG. 3 is a block diagram of a distance imager system of the present invention.

FIG. 3 shows another embodiment of the invention. Distance imager system 301 produces an array of distance measurements to an object 306 corresponding to pixels in an image. This embodiment of the present invention could be used, for example, as a face shape sensor in a security system. In this embodiment of the present invention, light sources 304 and 305, preferably of equal intensity, are sequentially and, preferably, repeatedly illuminated by electronics 307. During each activation of one of the light sources 304 and 305, a digital camera 302 acquires one or more frames of image data from the light reflected to the camera 302 from the object 306. Preferably, the electronics 307 activates the light sources 304 and 305 in synchronization with the sync line 308, which is an output from the digital camera 302. Alternately, if the digital camera can be controlled by sync line 308, the electronics can command the camera to acquire frames of data by sync line 308 as each of the light sources 304 and 305 is illuminated. Methods for synchronizing the digital camera 302 and the electronics 307 will be apparent to those of ordinary skill in the art. The method of obtaining range or direct distance data is substantially the same as for the direct distance measurement system 101 of FIG. 1. In this embodiment, each pixel of the camera 302 can be thought of as a single light detector. Thus, a distance value can be calculated for each pixel in the image.

In operation, the distance measuring system 101, 201, or 301 is aimed toward the object 104, 204, or 306, respectively. The respective electronics lights the appropriate sources and stores the received intensities in memory. Based on these intensities, one or more distance values are computed, and provided through the output 107, 207, or 309.

Figure 4:
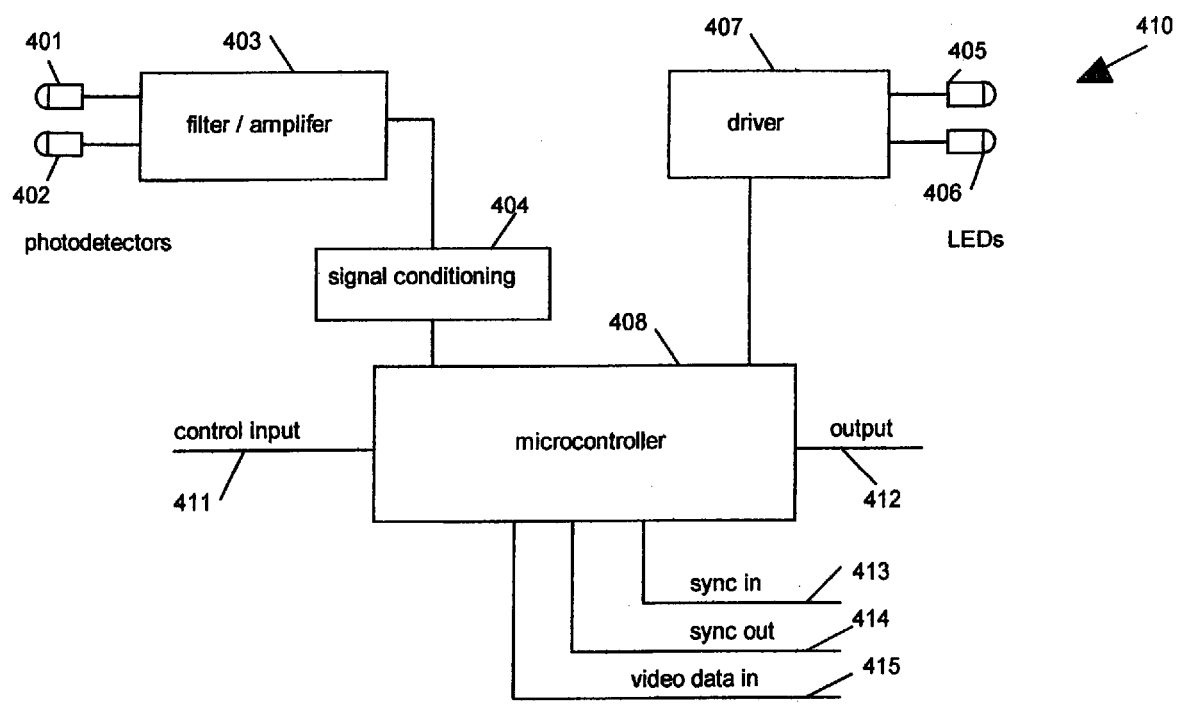
FIG. 4 is a block diagram of a preferred embodiment of an electronics module of the present invention.

FIG. 4 is a block diagram of a preferred embodiment of an electronics module 410 used in the distance measuring systems 101, 201, and 301 of the present invention. The LEDs 405 and 406 are illuminated, as needed, by a driver 407. The design of the driver 407 will be apparent to those of ordinary skill in the art. Preferably, the driver 407 provides a modulated driving signal to the LEDs 405 and 406; for example, the driving signal may be in the range of 100 Hz to 100 kHz. Photodetectors 401 and 402 serve as light detectors. Filter/amplifier 403 accepts the signals from the photodetectors and brings them to a useful voltage level. If the driver 407 provides modulated signals, the Filter/amplifier 403 preferably includes a filter, for example, a band pass filter, to extract the modulated signal from the background noise. A signal conditioner 404 takes the signal from the amplifier 403 and converts it into the format required by a microcontroller 408. Preferably, this includes the conversion of the signal amplitude into a voltage between 0 and 5 volts, for input to an analog-to-digital input of the microcontroller 408. If the driver 407 provides modulated driving signals, the signal conditioner 404 preferably includes a demodulation circuit, such as a peak detector. The signal conditioner 404 also preferably includes voltage-limiting circuitry to prevent excessive input voltages to the microcontroller 408. The design of these circuits will be apparent to those of ordinary skill in the art.

The microcontroller 408 includes a control input 411, preferably a serial data line, for example, from a PC. This input is monitored by the microcontroller software to set parameters, for example, data acquisition rate and modulation frequency. This input also preferably includes commands such as to begin and end measurement functions. The microcontroller 408 also includes a data output 412, preferably a serial data line, for example, to a PC. This output provides the distance measurements computed by the microcontroller software. The design of the control input and data output circuitry will be apparent to those of ordinal skill in the art.

Optionally, the microcontroller 408 includes a camera sync input 413, if a digital camera is used for data acquisition. The sync input 413 is used by the software to sequentially illuminate the LEDs 405 and 406, so that the correct LEDs are illuminated during each frame of video data. Optionally, the microcontroller 408 includes a camera sync output 414, if a digital camera accepting sync input pulses is being used. The sync output 414 is used by the software to command the camera to start the acquisition of a frame of video data at the correct time, in synchronization with the lighting of the correct LEDs. Video data in 415 is used to obtain the pixel intensity measurements from the camera, for performing the distance calculations. The electronics circuitry for these functions will be apparent to those of ordinal skill in the art.

In all embodiments of the present invention described above, a set of two or more light intensity measurements are obtained for each distance measurement desired. The algorithm to calculate distances from the light intensities is described here in connection with embodiment 101, but applies equally to embodiments 201 and 301.

The algorithm is based on a mathematical illumination model. In the preferred embodiment of the invention, the algorithm is based on a diffuse reflection illumination model (see Foley & van Dam, "Fundamentals of Interactive Computer Graphics", Addison-Wesley Publishing Company, Inc., ©) 1982, pp. 575–580). Preferably, if it is assumed that the direct (straight line) spacing between light sources 102 and 103 is given by D, the unknown distance from the light source 103 to object 104 is L, and the surface angle of object 104 with respect to the direction of light source 103 is Q, the light intensity detected by light detector 105 from light source 103, $i103$, is given by:

$$i103 = k \cos Q/L^2$$

and the light intensity detected from light source 102, $i102$, is $$i102 = k \cos Q/(L+D)^2$$

The ratio of these two measurements is then $$i101/i102 = (L+D)^2/L^2$$

The algorithm solves this expression for L, using solution techniques apparent to those of ordinary skill in the art. For a system with multiple measurements, for example, the distance imager system 301, this is repeated for each measurement point, for example, for each pixel in the acquired images. Techniques for implementation of the algorithm in the microcontroller or in an external device, such as but not limited to a personal computer, will be apparent to those of ordinary skill in the art.

Figure 5:
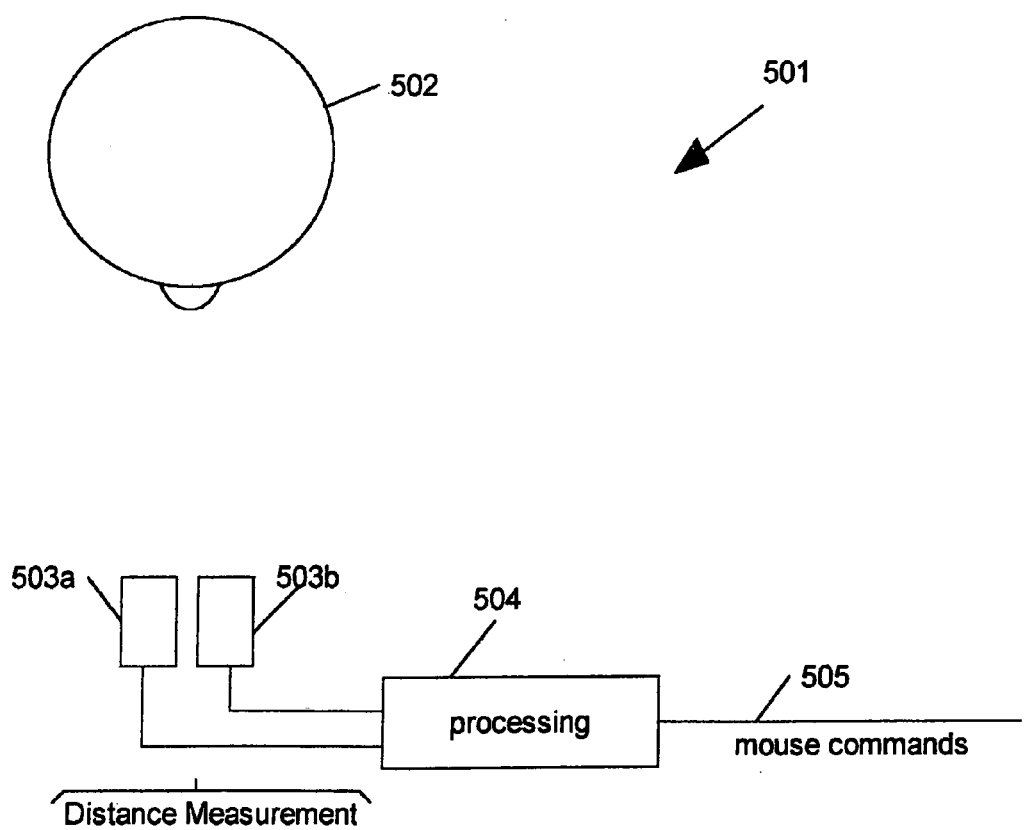
FIG. 5 is a block diagram of the present invention being applied as a head tracking device.

FIG. 5 is a block diagram of the present invention being applied as a head tracking device 501, for example, a head tracking device for disabled persons, such as people who cannot use their hands to control a computer mouse. In this embodiment, the invention is used to provide mouse commands, so that the disabled user can perform mouse functions by moving his or her head 502, rather than through the use of the mouse. The head tracking device 501 makes distance measurements to several locations on the user's head 502, and generates mouse commands to an output 505 from these measurements.

In a preferred embodiment of this application, distance measurement devices 503a and 503b are used to make distance measurements to areas on the left and right parts of the head, respectively. Preferably, the measurement devices 503a and 503b are measurement systems such as distance the measuring system 101. Alternately, other embodiments of the present invention can be used as the measurement devices 503a and 503b. When the user moves his or her head 502 to the left, the average distance measured by device 503a will tend to decrease, whereas the average distance measured by device 503b will tend to increase. If the measurement devices 503a and 503b are aimed toward the forehead, as the user tilts the head forward, the average distances measured by both measurement devices will tend to decrease. Processing 504 takes the distance measurements and the changes in distance measurements to calculate head motion parameters, and then converts these into mouse commands, which are sent to a computer through the output 505.

Figure 6:
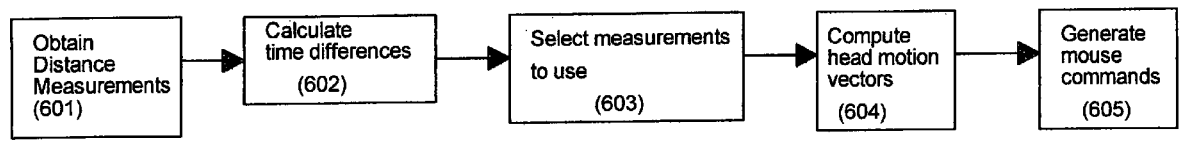
FIG. 6 is a flowchart showing the process of generating computer mouse commands from the distance measurements.

FIG. 6 is a flowchart showing the process of generating mouse commands from the distance measurements. First, in step 601, the distance measurements are obtained, as described above. Preferably, in step 602, the changes over time of each distance are obtained. Alternately, the actual distances could be used for computing head pointing information. In step 603, a subset of the measurements is selected to use. If there are only two measurements, such as in the preferred embodiment of FIG. 5, all measurements are used. Alternately, if a larger set of measurements is used, two are selected, for example, the pair of side by side measurements with the greatest time difference could be selected. Alternately, all measurements could be used with a weighting system based on the relative time differences. From the selected measurements, a head motion vector is computed in step 604. In the preferred embodiment, the difference between the left and right measurements from devices 503a and 503b is used as the horizontal component of the motion vector, and the sum of the left and right measurements is used as the vertical component. Finally, in step 605, the vector is converted into a mouse command. For example, the head motion vector from step 604 can be converted into the horizontal and vertical components of the mouse command. The implementation of each of these steps will be apparent to those of ordinary skill in the art.

Figure 7:
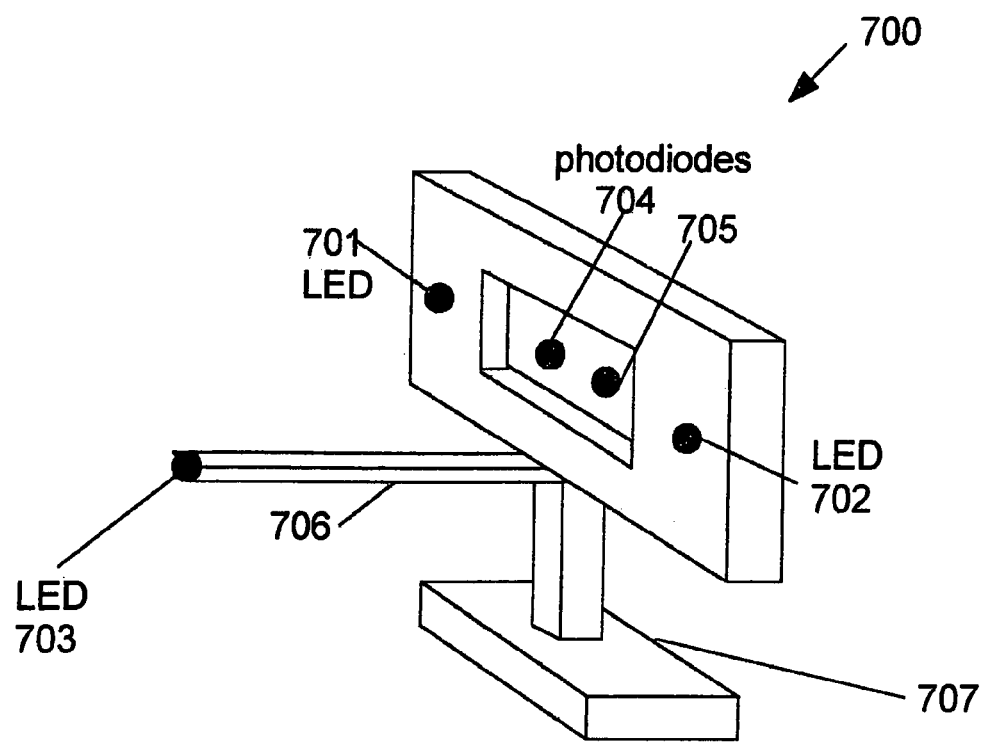
FIG. 7 illustrates a preferred embodiment of a head tracking optical unit that shares some of the components of two distance measuring devices of the present invention.

FIG. 7 illustrates a preferred embodiment of a head tracking optical unit 700 that shares some of the components of two distance measuring devices, such as devices 503a and 503b in FIG. 5. Rather than completely independent sets of LEDs and photodiodes, some components are shared. Photodiode 704 and photodiode 705 are the light detectors for the two distance measuring devices, and are oriented so that they detect light from horizontally offset areas of the user's face. The LED 703, held in its position by arm 706, serves as the "near" LED for both measuring devices. LED 701 and LED 702 are simultaneously illuminated to serve as the "far" LED for both measuring devices. Preferably, all LEDs are arranged to avoid direct transmission of light to photodiodes 704 and 705. The entire unit is preferably mounted on stand 707, which can contain adjustments to aim the light at the user's face. Connection and use of the head tracking optical unit 700 according to the present invention will be apparent to those of ordinary skill in the art.

Figure 8:
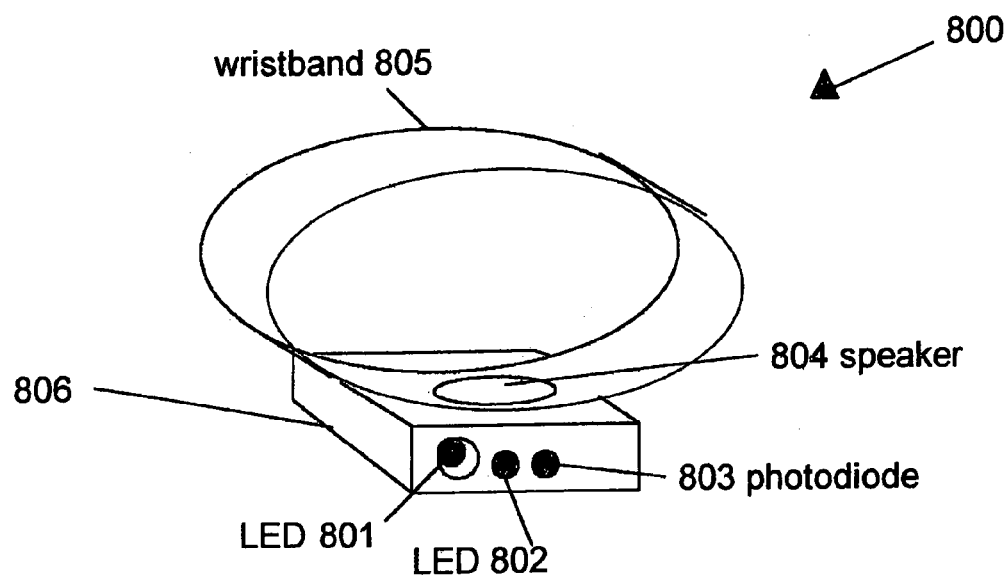
FIG. 8 illustrates an application of the present invention as wristband distance sensor.

The present invention can also be used as an aid for blind people to locate nearby objects. FIG. 8 illustrates a preferred embodiment of this application, as wristband distance sensor 800. A wristband 805 holds enclosure 806, containing the electronics circuitry. Preferably, the LEDs and photodiodes are configured according the preferred embodiment of the distance measuring device 101. LED 801 is the "far" LED and LED 802 is the "near" LED. Photodiode 803 receives the reflected light signals transmitted by the LEDs.

Preferably, the output of the distance sensor is a vibration signal that can be felt by the user. For example, a miniature speaker 804 can be attached to the wristband 805, so that the vibration is easily felt on the user's wrist. The speaker preferably is controlled to vary its vibration frequency as a function of the measured distance. Alternately, the amplitude, or both amplitude and frequency could be varied. The mechanical and electrical design and connection of these parts according to the present invention will be apparent to those of ordinary skill in the art.

Figure 9:
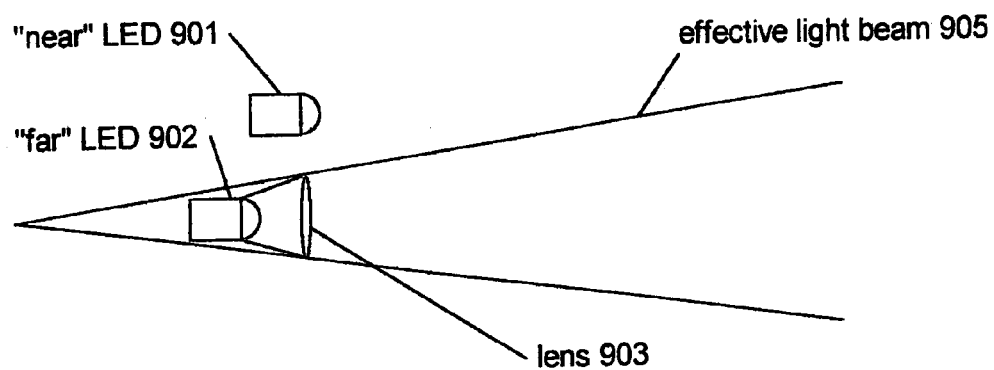
FIG. 9 shows an alternate embodiment of an optical arrangement of light-emitting diodes using a lens.

FIG. 9 shows an alternate embodiment for the near and far light sources 102 and 103 of the system 101. In the embodiment of FIG. 9, the alternate embodiment has an optical arrangement of a "near" LED 901 and a "far" LED 902. This embodiment is useful for applications where the maximum allowable distance between the two LEDs is limited. For example, this could be done in the wristband distance sensor 800. A lens 903 is placed in the light path of the "far" LED 902. The lens bends the light beam 905 such that the effective optical distance from the LED 902 to the reflective surface of the object is greater than the physical distance. For example, a convex lens may be used for this purpose. Optionally, a lens could be placed in front of the "near" LED 901 to make the optical distance from the "near" light detector to the reflective surface of the object less than the physical distance to the reflecting surface of the object.

Figure 10:
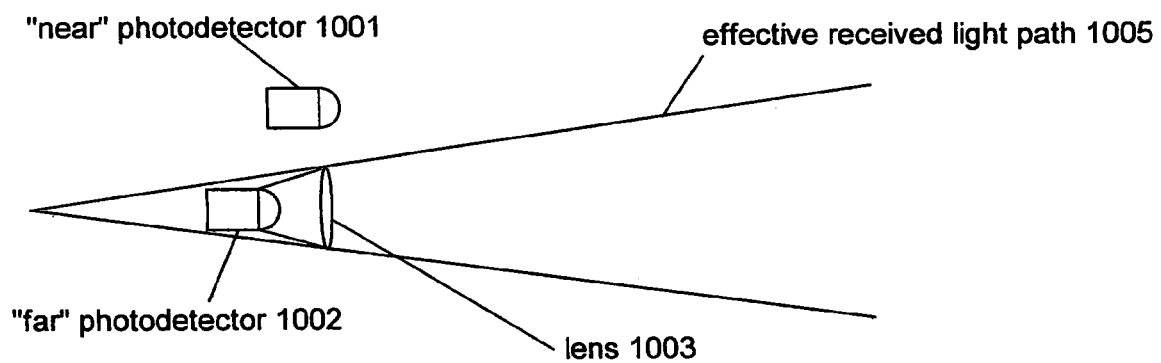
FIG. 10 shows an alternate embodiment of an optical arrangement of photodiodes using a lens.

FIG. 10 shows an alternate embodiment of the optical arrangement for the "near" and "far" light detectors 203 and 202 used in the system 201. This embodiment is useful for applications where the maximum allowable distance between the two light detectors is limited. For example, this could be done in the wristband distance sensor 800. A lens 1003 is placed in the reflected light path of the "far" light sensor 1002. The lens bends the reflected light beam from the object such that the effective optical distance from the reflective surface of the object to the "far" light sensor 1002 is greater than the physical distance. For example, a convex lens may be used for this purpose. Optionally, a lens could be placed in front of the "near" light detector 1001 to make the optical distance from the reflective surface of the object to the "near" light detector less than the physical distance to the reflecting surface of the object. The selection of lenses and arrangement of the components to do this will be apparent to those of ordinary skill in the art.

In many applications where a distance between a reference point and a point of interest on an object is to be measured, it may be undesirable to have the light sources or detectors of a distance measuring system offset from each other in the direction from the reference point to the point of interest on the object, as required in the embodiments described above, for example, the offset between LED 102 and LED 103 of the distance measuring system in FIG. 1. One alternative for measuring the distance between a point of interest on an object and a reference point is to make use of a small offset of the light sources or light detectors of a distance measuring system in at least a perpendicular direction to a straight line extending between the point of interest on the object and the reference point. This alternative embodiment of the present invention for measuring the distance along a straight reference line from a reference point on the reference line to a point or points of interest (e.g. a point or points on an object) located on or substantially on the reference line forward of the reference point makes use of an optical effect that will herein be called the "offset angle effect", and which is described below. With respect to the point or points of interest, the term "substantially on the reference line" means that the point or points of interest, although not on the reference line, are sufficiently close to the line to assure accurate distance measurements by the systems of the present invention. The offset angle effect measures the distance between a point of interest on or substantially on a straight reference line and forward of a reference point located on the reference line by taking into account how the intensity of light transmitted to the point of interest from a light source and reflected from the point of interest to the reference point is affected by a) the distance along a straight line from the light source to the point of interest, b) the offset angle between the direction of maximum light radiation emission from the light source and the straight line from the light source to the point of interest, and c) the perpendicular offset distance at which the light source is located with respect to the reference line. For ease of creating a mathematical model for processing the data generated by the offset angle effect, the perpendicular offset distance at which the light source is located with respect to the reference line is the perpendicular distance between the light source and that line at or substantially at the reference point. However, while complicating the creation of the mathematical model for processing the data generated by the offset angle effect, the perpendicular offset distance at which the light source is located with respect to the reference line can extend from the light source to a point on the reference line other than the reference point.

Figure 11:
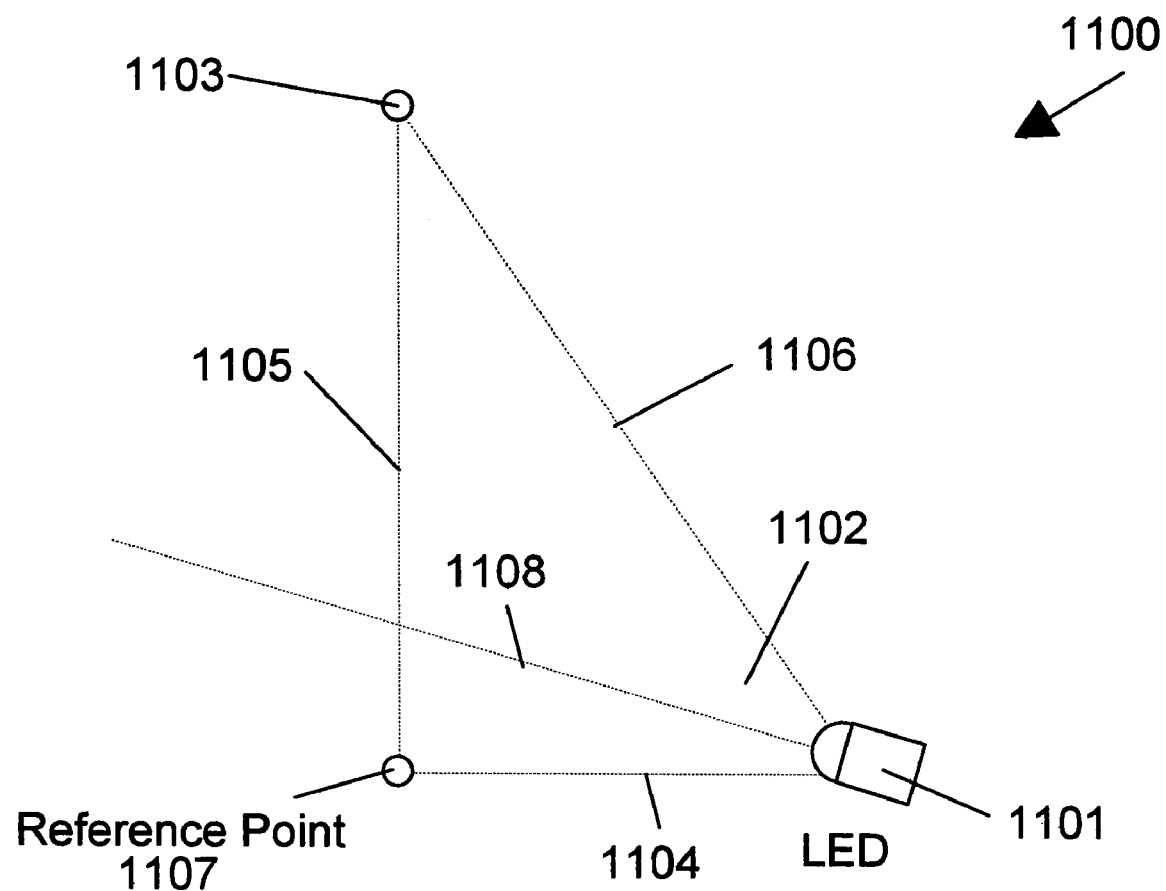
FIG. 11 schematically shows an alternate embodiment of the present invention that utilizes an offset angle effect to measure the distance between a reference point and a point or points of interest located on or substantially on a reference line forward of the reference point.

FIG. 11 is a drawing depicting an offset angle effect 1100 exhibited by LED light source 1101 shining on a point of interest 1103 on a straight reference line 1105. The intensity of light at the point of interest 1103 is a function of both the distance of a straight line 1106 from the LED light source 1101 to the point of interest 1103 and the offset angle 1102 between the direction 1108 of maximum light radiation emission from the LED light source 1101 and the straight line 1106 between the LED light source 1101 and the point of interest 1103. LED's typically emit the greatest light energy output (the maximum energy emission) in their orientation direction (direction 1108 in FIG. 11) with the light energy output from the LED's decreasing as a function of increased offset angle 1102. With the reference point 1107 of the reference line 1105 fixed relative to the LED light source 1101, as the distance along the reference line 1105 from reference point 1107 to the point of interest 1103 increases, from trigonometry, it will be apparent that the offset angle 1102 also increases due to the fixed perpendicular offset distance between the reference point 1107 and the LED light source 1101 represented by line 1104. If the perpendicular offset distance represented by the line 1104 were equal to zero, however, the offset angle 1102 would remain constant as the distance 1105 increases. Therefore, due to this offset angle effect, the intensity of light from the LED light source 1101 at the point of interest 1103, or reflected from the point of interest 1103, varies not only with the inverse square of the distance along line 1106 between the LED light source 1101 and the point of interest 1103, but also as a function of the change in the offset angle 1102 caused by a change in the distance along line 1105 from the point of interest 1103 to the reference point 1107.

In addition to the straight line distance along line 1106 between the LED light source 1101 and the point of interest 1103 and the offset angle between lines 1106 and 1108, the amount of light emitted by the LED light source 1101 and reflected from the point of interest 1103 also depends on several other factors, such as the reflectivity properties of the point of interest 1103. However, if multiple LED light sources 1101 with differing orientation angles are used, and if the radiation pattern of these LED light sources 1101 as a function of their offset angles is known, it will be apparent to those of ordinary skill in the art that the multiple intensity measurements provided by these light sources can be used to cancel such factors and to determine the distance along the reference line 1105 from the point of interest 1103 to the reference point 1107.

Figure 12:
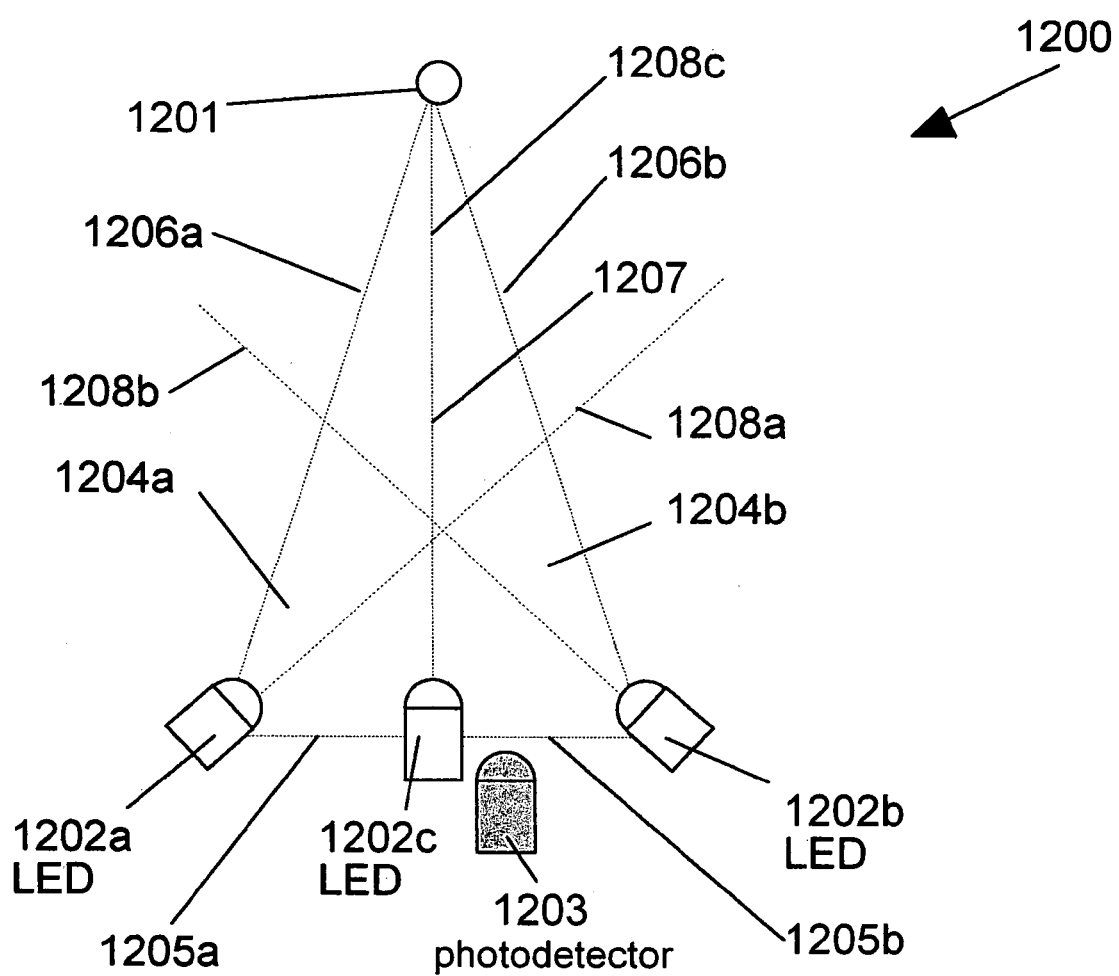
FIG. 12 schematically shows a first distance measuring system of the present invention that utilizes the offset angle effect to measure the distance between a reference point and a point or points of interest.

FIG. 12 shows a preferred embodiment of a distance measuring system 1200 that uses multiple LED light sources to take advantage of the offset angle effect. The system 1200 includes a configuration of multiple LED light sources 1202a, 1202b, and 1202c, and a single light detector 1203 located at or substantially at the reference point of the system. The LED light sources 1202a, 1202b, and 1202c have their greatest light energy output (the maximum energy emission) in their orientation directions represented by lines 1208a, 1208b, and 1208c, respectively. While as schematically shown FIG. 12, the light detector 1203 appears to be offset from the straight reference line 1207 which coincides with line 1208c, the light detector 1203 is in fact located on the reference line or substantially on the reference line 1207 at or substantially at the reference point of the system in the same or substantially the same location as the LED light source 1202c so that any error introduced by the light detector 1203 being other than precisely on the reference line 1207 at the reference point of the system 1200 does not materially affect the measurement made by the system 1200. With the light detector 1203 located at or substantially at the reference point of the system 1200 and coinciding or substantially coinciding with LED light source 1202c, the LED light source 1202c and the direction 1208c of greatest light energy output for LED light source 1202c are not offset from the reference line 1207, but the LED light sources 1202a and 1202b are offset from that the reference line 1207 by the perpendicular offset distances along lines 1205a and 1205b and their directions 1208a and 1208b of greatest light energy output do not coincide with the reference line 1207. In the operation of this embodiment, light follows light paths that begin at each of the LED light sources 1202a, 1202b, and 1202c, reflect from the point of interest 1201, and are then received by the light detector 1203 that is located at or substantially at the reference point of the system.

As discussed above, LED's typically emit the greatest light energy output (the maximum energy emission) in their orientation direction (e.g. the direction 1108 in FIG. 11 and the directions 1208a, 1208b, and 1208c in FIG. 12) with the light energy output from the LED's decreasing as a function of increased offset angle (e.g. the offset angle 1102 in FIG. 11 and the offset angles 1204a and 1204b of FIG. 12). In a similar manner, light detectors typically have a direction of maximum light energy detection sensitivity in their orientation direction with the light energy detection sensitivity decreasing as a function of increased offset angle. As a result of these analogous characteristics between LED's and light detectors, a similar configuration of multiple light detectors and a single LED light source located at or substantially at the reference point of the system could be used, with light from the single LED light source following a single path to the point of interest and being reflected by the point of interest in a plurality of light paths that reach each of the multiple light detectors. Alternately, multiple LED light sources and multiple light detectors could both be used in the same system. In addition to the offset of the LED light sources 1202a and 1202b in the direction perpendicular to the reference line 1207 of the system 1200, the LED light sources 1202a, 1202b and 1202c could also be offset with respect to each other in a direction parallel to the reference line 1207, if desired.

The minimum configuration of a distance measuring system according to the present invention, using multiple LED light sources and a single light detector, is two LED light sources, rather than the three LED light sources shown in FIG. 12. However, if there were only two LED light sources, for example LED light sources 1202a and 1202c, and if the point of interest 1201 were to move toward the right in FIG. 12, the light from the LED light source 1202a reflected by the point of interest 1201 would increase relative to the light from LED light source 1202c reflected by the point of interest 1201. This relative increase in the light from the LED light source 1202a that is reflected relative to the light from the LED light source 1202c that is reflected is caused by a decrease in the offset angle 1204a between the direction 1208a of greatest light energy output of the LED light source 1202a and the straight line 1206a between the LED light source 1202a and the point of interest 1201 and an increase in the offset angle between the direction 1208c of greatest light energy output of the LED light source 1202c and a straight line (not shown) between the LED light source 1202c and the point of interest 1201. If there is a second angled LED light source, such as LED light source 1202b, the light from the LED light source 1202b reflected from the point of interest 1201 will also decrease relative to the light from the LED light source 1202a as the point of interest 1201 moves toward the right due to an increased offset angle. Combining the measurements from the two angled LED light sources 1202a and 1202b, for example, by averaging their responses, tends to cancel this effect and makes the response of the system less dependent on the left/right position of the point of interest 1201 relative to the position on the reference line 1207 shown in FIG. 12. Appropriate algorithms for computing the distance from the reference point of the system, where in the embodiment shown the light detector 1203 is located, to the point of interest 1201 using the three LED light source system of FIG. 12, based on the offset angle effect, will be apparent to those of ordinary skill in the art. It will also be apparent that the LED light sources 1202a, 1202b, and 1202c need not be arranged in a symmetrical configuration as shown, but rather could be aimed in arbitrary directions, as appropriate to the application, and similar solution techniques could be used. Additionally, different angular offsets of LED light sources could be used to measure distances in different ranges. For example, for more distant objects, it would be preferable to aim the LED light sources more in a forward angle, to allow more light to shine on and reflect from the point(s) of interest.

For best results, the sensitivity pattern for the light detector 1203 should preferably be narrower than the radiation pattern(s) of LED light sources 1202a, 1202b, and 1202c, so that the reflected light that is detected by light detector 1203 is from a particular point of interest or area on the object of interest that is illuminated by portions of the radiation pattern of each of the LED light sources. Similarly, for a multiple light detector configuration, the radiation pattern of the LED light source should preferably be narrower than the sensitivity pattern(s) of the multiple light detectors.

For an arbitrary object, the results described here can be extended to include summation or integration over a large set of points, for example, including point of interest 1201, on the object, with corresponding angles, including angles 1204a and 1204b, and hence providing data to compute an approximate average of the distance from the reference point to the object.

LED light source and light detector manufacturers typically publish the radiation patterns of their LED light sources and light detectors. Alternately, the radiation patterns can be measured experimentally with a light detector or light emitter. The radiation or sensitivity pattern could optionally be modified by the use of lenses, baffles, varying opacity of an optical covering, or other techniques to control the variation in light intensity as a function of the offset angle, to meet desired system specifications. The present invention will work with unequal radiation patterns for the various LED light sources, but for simplicity, here it is assumed that the radiation pattern is the same for both.

With this information, and with basic trigonometry, the intensities of light received by a light detector at the measurement device can be derived. For example, if a diffuse reflection model is assumed, the light intensity reflected by an object will be proportional to the cosine of the angle with respect to the light source, in addition to the distance and offset angle effects described above. Other light reflection models could be used, as appropriate.

Various simplifying assumptions can be made to enable efficient computation of the distance along the reference line 1207 from the reference point of the system where the light detector 1203 is located to a point 1201. Examples of such assumptions include:

1) assume that the point of interest 1201 is directly in front of LED light source 1202c and average the resulting calculations for distance along the reference line 1207 from data from the two LED light sources 1202a and 1202b;

2) assume that the optical light loss over distances 1206a and 1206b are the same as over the distance 1208c, if the perpendicular distances 1205a and 1205b can be assumed much smaller than the distance 1208c;

3) assume the surface angle at which the light reflects from the point of interest on the object to be the same for all LED light sources 1202a, 1202b, and 1202c.

Additionally, other approximations and assumptions to reduce the number of unknowns to make the light reflection equations solvable will be apparent to those of ordinary skill in the art, as relevant to the particular application being considered.

As a simple alternative to the mathematical model above, other data processing techniques can be used in some applications. For example, in a head tracking, computer control application, the absolute distances are not typically of great importance—rather, relative values and changes are important. A simplified algorithm could thus be used, for example, to compute the ratio of the received light intensity from the straight LED light source 1202c to the received light intensity of each angled LED light source 1202a and 1202b. These ratios will vary monotonically with distance, although will not be precisely proportional to distance. The average of the two ratios could yield a simple, qualitative indication of distance. Other simplifying algorithms will be apparent to those skilled in the art.

With two or more offset LED light sources in the system, the solution of similar equations to those described above will be apparent to one of ordinary skill in the art. An additional advantage of using multiple offset LED light sources, for example LED light sources 1202a and 1202b, is that the relative responses from the multiple LED light sources can also be used to estimate the direction of offset of an object from a straight ahead position. For example, if the point of interest 1201 is moving to the right or left of the straight-ahead position shown in FIG. 12, the object offset angle would be the angle to the point of interest 1201 relative to the straight-ahead angle where the point of interest 1201 is shown in FIG. 12. Derivation of this quantity, based on geometry and optical device characteristics, will be apparent to those skilled in the art, by using similar equations, methods, and types of approximation discussed above. One very simple example of a qualitative generation of an object offset angle is as follows: where the LED light sources 1202a and 1202b have the same intensities and radiation patterns, if the light from the LED 1202a in FIG. 12 reflected from the point of interest 1201 is greater than the light from the LED 1202b in FIG. 12 reflected from the point of interest 1201, the system could simply state that the object appears to be offset to the right.

It will be apparent to those of ordinary skill in the art that the present invention can be used similarly with a single LED light source and multiple light detectors. With this embodiment, the sensitivity pattern of the light detectors would yield an offset angle effect rather than the radiation pattern of the LED light sources, and thus similar results. It will also be apparent that a configuration of the present invention having both multiple LED light sources and multiple light detectors could be used.

This simple model of the operation of the invention could be replaced by a more sophisticated model, including factors such as non-diffuse reflection of light, including the radiation/sensitivity pattern of both emitters and detectors, etc., and correspondingly higher accuracy in distance measurements could be anticipated. Learning techniques, such as a Neural Network, would be appropriate for encoding these complex relationships from data collected from known situations. Using the basic invention as shown above, the implementation of a suitable model will be apparent to those of ordinary skill in the art.

The use of a distance measuring system based on the configuration of FIG. 12 can be very similar to the use of the vertically offset system shown in the previous figures. In most cases, the distance measurement system 1200 could simply be placed in the same part of the application as another type of distance measuring system, and the resulting behavior, such as a wristband distance sensor or a head tracking unit, will be very similar.

Figure 13:
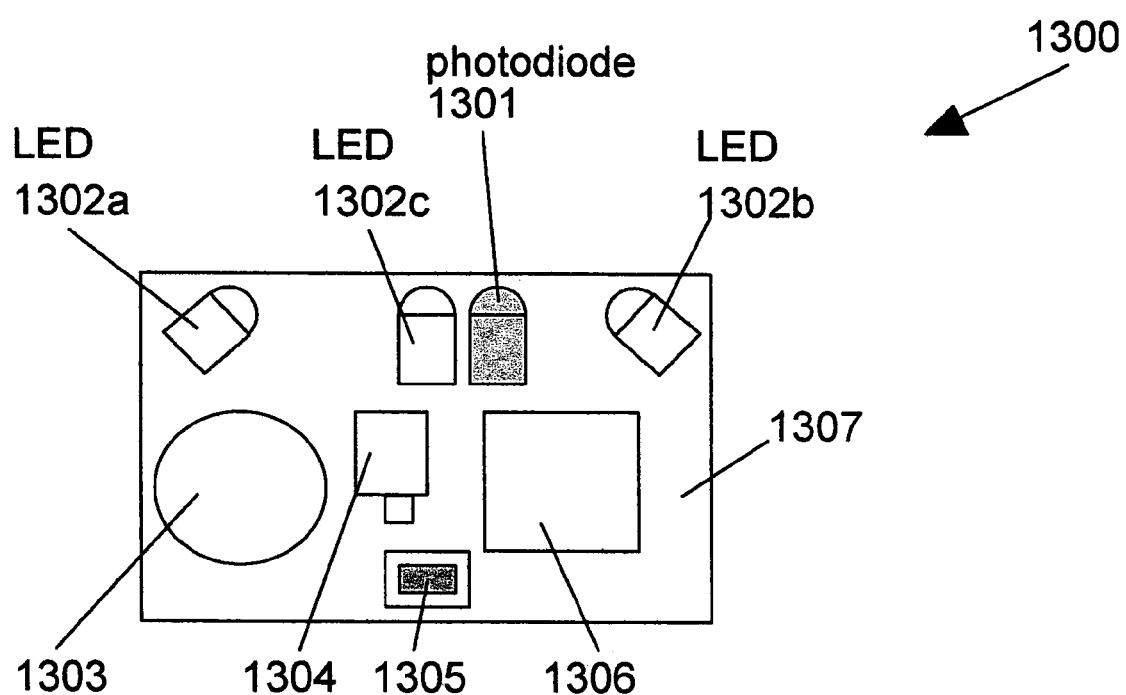
FIG. 13 schematically shows a second distance measuring system of the present invention that utilizes the offset angle effect to measure the distance between a reference point and a point or points of interest.

For example, a configuration of two or three LED light sources and a light detector, preferably a photodiode, could be used along the top edge of a watch-like housing, similar in overall function to wristband distance sensor 800 shown in FIG. 8. FIG. 13 is a diagram of a watch circuit board 1300 according to the present invention utilizing the offset angle effect A battery 1303, processing electronics 1306, and a vibration device 1304 are shown, all mounted on the printed wiring board 1307. A pushbutton switch 1305 is included to allow user control, for example on/off, or setting of different modes of operation or distance ranges. Optionally, an audio device could be mounted within the housing, or could be used instead of vibration device 1304. In this embodiment, three LED light sources 1302a, 1302b, and 1302c are included, along with one photodiode 1301. These optical devices may be aimed upward from the printed wiring board 1307 to reduce reflections from the user's hand. Optionally, a baffle may also be installed to avoid the radiation pattern from the LED light sources from impinging on the hand. In addition to an output based on the amplitude or frequency of vibration or sound output, a series of vibration or sound pulses could be used as a user output. The timing between the pulses and/or the duration of the pulses could indicate the distance to detected objects. The three LED light source configuration shown in FIG. 13 could additionally be used to indicate the offset angle of the object, for example right or left. In addition to measuring distances, photodiode 1301 or one or more additional photodiodes, could be used to give an indication of the brightness of the visual scene in the direction at which the watch is pointed. This could easily be measured by taking light intensity measurements when none of the LED light sources 1302a, 1302b, or 1302c is illuminated. Alternately, the intensity of the reflected light from one or more LED light sources, for example 1302c, could be used to indicate the reflectivity of an object of interest. This information may be helpful for a blind user to obtain further information about their surroundings.

One potential issue with using wristband distance sensor is that if the wrist is in an inappropriate position, the hand can partially or wholly occlude the light paths to the object of interest (point of interest), providing inaccurate data. If this occurs, the light intensity received by the photodiodes over one or more of the light paths will be abnormally high, due to the very close proximity of the hand to the wristband distance sensor. Preferably, the processing electronics used for distance determination also detects this condition and an indication to the user is provided to indicate this error situation, for example, a constant vibration or tone indicating hand occlusion. This will help the user to then properly orient the wrist for proper device performance. Alternately, additional LED light sources or photodiodes may be added to the basic configuration to measure the distance in several directions, and if a reflection from the hand is detected, an estimate of the amount of signal reflected from the hand over the other light paths can be subtracted, thus partially or wholly canceling the effect of the inadvertent hand reflections. Algorithms for estimating the amount of signal reflected, based on the orientation of the LED light sources, and photodiodes, and based on additional assumptions, for example, an assumption of constant reflectivity of light from human skin, will be apparent to those of skill in the art.

The optimal position of the wristband distance sensor on the user's wrist may depend on the task being performed by the user. For example, as an aid for grasping objects, it may be preferable to have the wristband distance sensor on the palm side of the wrist, so that the wristband distance sensor is measuring the distance to an object (point of interest) on that side of the hand. However, as a navigational aid, such as for locating larger objects (points of interest) in a room, it may be preferable for the wristband distance sensor to be on opposite side of the hand, and possibly to have the optical devices aimed perpendicular to the forearm. Thus, the wristband distance sensor preferably can easily be relocated on various parts of the wrist. One way to provide for this is an easily loosened wristband, e.g., an elastic wristband that can be rotated around the wrist without difficulty. Another way to provide this would be a snap or hook-and-loop attachment of the wristband distance sensor onto multiple positions on the wristband. For choosing a forward or perpendicular aiming of the optical devices with respect to the forearm, or optionally for more precise aiming of the optical devices with respect to the forearm, several approaches for aiming include: a mechanically movable part of the wristband distance sensor that the user can orient to different angles, or a fixed set of several sets of optical devices that can be selected by the user, for example by pressing control switch 1305 in FIG. 13.

The watch circuit board 1300 preferably is enclosed in a small plastic enclosure, with a button to allow user access to pushbutton switch 1305 and an LED cover that allows the light at the frequency of LED light source operation, for example, infrared, to pass through. The vibrations of vibration device 1304 could be coupled to the user's wrist simply by the pressure provided by the wristband of the enclosure against the wrist, or by other more complex mechanical means, such as by vibration isolating part of the contact area of the enclosure against the wrist, and rigidly coupling the circuit board 1300 to that area. Other related techniques for vibration coupling will be apparent to those of skill in the art.

Another example application of the present offset angle effect based invention is as the distance-measuring component of a head-tracking device, as described above. Using the offset angle effect, rather than a parallel offset of LED sources or light detectors in the direction of measurement may provide for a more compact package for the head-tracking device. If properly oriented, the distance to the user's head or to an area of the user's head (point of interest) will vary with the up/down motion of the head. For example, if the distance measuring system 1200 in FIG. 12 is used to measure the distance to the forehead, an upward motion of the head will increase the distance to the forehead. Optionally, additional LED light sources or light detectors could be added to the configuration shown in FIG. 12 to obtain more precise information on the up/down motion of the head. Selection of the best light detector, based on a calibration motion of the head, or combination of multiple light detector channels would provide the data for this up/down motion. Combination of multiple light detector channels could be achieved by performing an average of the channels, a weighted average, or by more complex methods, such as a Neural Network that is trained to interpret the data from the channels. Other techniques of processing the light detector information for up/down motion will be apparent to those of ordinary skill in the art.

The left/right motion of the head will cause a variation in the relative light intensities of light that reflects from horizontally-offset areas of the user's head, for example, relative variations between the light reflected from LED sources 1202a and 1202b in FIG. 12. The pattern of relative light intensities could be determined by the difference, the ratio, or a more complex mathematical relationship between the two intensities. Optionally, additional LED light sources aimed in other directions could be used to obtain more precise measurements of left/right motion, for example, by selecting the two that give the greatest variation during a calibration motion of the head, or by combining the readings from all LED channels. Likewise, multiple light detectors could be used, each aimed in a different direction. One way to process the data from such multiple LED or light detector channels is the use of a Neural Network. Other techniques of processing the light detector information for up/down motion will be apparent to those of ordinary skill in the art. For both the up/down and right/left motion, it will be apparent that the roles of LED light source and light detector may be reversed with similar results, as described above.

Due to its ability to measure distances to the user, a head-tracking device based on the present invention could automatically shut down or go into standby mode when it determines that there is nothing within a certain range, and thus avoid extraneous control actions or unnecessary power usage.

Although the preferred embodiment of the present invention is described in terms of LED light sources and light detectors (for example, photodiodes, phototransistors and photosensitive diodes), it will be apparent that other embodiments of the invention using other light sources, for example, incandescent or fluorescent light sources, or other light detectors, for example, conductive photocells, are also possible. To avoid room lighting, sunlight, and other lighting from interfering with the operation and accuracy of the distance measuring systems of the present invention, the light sources used in the distance measuring systems of the present invention can be chosen to emit modulated light at a selected frequency (e.g. 2000 hertz) and the light detectors and processing electronics of the distance measuring systems of the present invention can be set up to only process modulated light having that certain frequency (e.g. 2000 hertz).

Accordingly, the reader will see that the present invention can be used in a wide variety of distance measurement applications. Many of the embodiments of the present invention do not require the use of lenses or other light focusing mechanisms, and have very simple optical designs. High frequency pulses and electronics are not required by the present invention. Thus, the present invention solves the problems cost and complexity of many previous optical distance measurement approaches.

While there has been illustrated and described what is at present considered to be the preferred embodiment of the present invention, it will be understood by those skilled in the art that various changes and modifications may be made and equivalents may be substituted for elements thereof without departing from the true scope of the invention. For example, more than two light sources or light detectors could be used to obtain additional information or increased accuracy about the distance or angle to a target object. Specular reflection models (see Foley & van Dam, pp. 577–580) could alternately be used to obtain distance measurements. Other types of light sources, such as fluorescent or incandescent light could be used. Other types of light detectors, such as phototransistors and photocells could be used. Instead of sequential illumination of the light sources, the simultaneous illumination of light sources of different colors or modulation frequencies could be utilized. The head tracker could be used for many other tracking applications, such as following the motion of hands or feet or other body or mechanical parts. Many other configurations of the distance measuring device for blind people could be created, such as hand-held, or clothing-mounted configurations. Arrays of distance measuring devices, possibly sharing some light sources or detector components could be used with the present invention. Applications include a row of distances to monitor patients' position in beds. Therefore, it is intended that this invention not be limited to the particular embodiment disclosed, but that the invention will include all embodiments falling within the scope of the appended claims.

What is claimed is:

1. A distance measuring system for measuring a distance between a reference point and a point of interest, comprising:
   a distance measuring device having a straight reference line extending forward of the device and a reference point located on the reference line;
   the device having light source means for emitting light to be reflected from points forward of the device and the reference point that are located on or substantially on the reference line;

the device having light detector means for detecting intensities of light emitted by the light source means and reflected to the light detector means from points forward of the device and the point of reference that are located on or substantially on the reference line and for generating electronic signals related to the detected intensities;

at least the light source means comprising multiple light sources that are each fixed relative to the reference point with the light sources being offset from each other in a direction perpendicular to the reference line and at least one of the light sources being located a fixed perpendicular offset distance from the reference line or the light detector means comprising multiple light detectors that are each fixed relative to the reference point with the light detectors being offset from each other in a direction perpendicular to the reference line and at least one of the light detectors being located a fixed perpendicular offset distance from the reference line so that intensities of light emitted by the light source means, reflected from any of the points forward of the device that are located on or substantially on the reference line, and detected by the light detector means generates electronic signals that can be used to determine a distance between the reference point and a point on a surface of an object that is located forward of the device on or substantially on the reference line; and electronic means for receiving the electronic signals generated by the light detector means and for computing, utilizing light intensity emitting patterns of the light sources and locations of the light sources relative to the reference line or light intensity detecting sensitivity patterns of the light detectors and locations of the light detectors relative to the reference line, a distance from the reference point to a point on a surface of an object located on or substantially on the reference line.

2. The distance measuring system according to claim 1, wherein:

the light source means comprises two light sources that are oriented to emit maximum light energy at different angles with respect to each other or the light detector means comprises two right detectors that are oriented to most sensitively detect light energy at different angles with respect to each other.

3. The distance measuring system according to claim 1, wherein:

the light source means comprises three light sources and the light detector means has a single light detector.

4. The distance measuring system according to claim 1, wherein:

the light source means has a single light source and the light detector means comprises three light detectors.

5. The distance measuring system according to claim 1, wherein:

at least the light source means comprises three light sources or the light detector means comprises three light detectors; and the electronic means for receiving the electronic signals generated by the light detector means and for computing, utilizing the light intensity emitting patterns of the light sources and the locations of the light sources relative to the reference line or the light intensity detecting sensitivity patterns of the light detectors and the locations of the light detectors relative to the reference line, a distance from the reference point to a point on a surface of an object located on or substantially on the reference line also computes whether the point on the surface of the object is located on a left or right hand side of the reference line or whether the point on the surface of the object is located on a left or right hand side of the reference line and a distance of the point from the reference line.

6. The distance measuring system according to claim 1, wherein:

the electronics means generates a vibration output through vibration coupling means to be coupled to a user to inform the user of a distance to an object.

7. The distance measuring system according to claim 6, wherein:

the device is attached to a wristband and vibration coupling means couples the vibration output to a wrist of a user.

8. The distance measuring system according to claim 7, further comprising:

hand occlusion detection means to detect when light from the light source means is being reflected to the light detector means by a users hand; and hand occlusion warning means, wherein an output to a user is provided when hand occlusion is detected by the hand occlusion detection means, whereby a user is made aware of the hand occlusion.

9. The distance measuring system according to claim 8, further comprising:

the hand occlusion detection means for detecting the intensity of light reflected from a users hand, computing an estimate of the intensity of light reflected by the hand, and using the estimate to modify the distance determined by the device.

10. The distance measuring system according to claim 7, further comprising:

relocation means for enabling the device to be moved to multiple positions on a users wrist, whereby a user can easily re-orient the distance measuring device so as to enable a wider variety of user tasks.

11. The distance measuring system according to claim 7, further comprising:

aiming means, for aiming the light source means or the light detector means, by an action of a user to aim at least one of the light sources or at least one of the light detectors toward a desired direction.

12. A method for measuring a distance between a reference point and a point of interest, comprising:

emitting light from a light source means for emitting light to be reflected from a point that is located forward of the light source means, located forward of a reference point, and located on or substantially on a straight reference line extending forward from the reference point which is located on the reference line;

detecting light intensities with a fight detector means for detecting intensities of light emitted by the light source means and reflected to the light detector means from the point and for generating electronic signals related to the detected intensities;

at least the light source means comprising multiple light sources that are each fixed relative to the reference point with the light sources being offset from each other in a direction perpendicular to the reference line and at least one of the light sources being located a fixed perpendicular offset distance from the reference line or the light detector means comprising multiple light detectors that are each fixed relative to the reference point with the light detectors being offset from each other in a direction perpendicular to the reference line and at least one of the light detectors being located a fixed perpendicular offset distance from the reference line so that intensities of light emitted by the light source means, reflected from the point, and detected by the light detector means generates electronic signals that can be used to determine a distance between the reference point and a point on a surface of an object that is located forward of the reference point and on or substantially on the reference line; and inputting the electronic signals into electronic means for computing, utilizing light intensity emitting patterns of the light sources and locations of the light sources relative to the reference line or light intensity detecting sensitivity patterns of the light detectors and locations of the light detectors relative to the reference line, a distance from the reference point to a point on a surface of an object located on or substantially on the reference line.

13. The method for measuring a distance according to claim 12, wherein:
the light source means comprises two light sources that are oriented to emit maximum light energy at different angles with respect to each other or the light detector means comprises two light detectors that are oriented to most sensitively detect light energy at different angles with respect to each other.

14. The method for measuring a distance according to claim 12, wherein:
the light source means comprises three light sources and the light detector means has a single light detector.

15. The method for measuring a distance according to claim 12, wherein:
the light source means has a single light source and the light detector means comprises three light detectors.

16. The method for measuring a distance according to claim 12, wherein:
at least the light source means comprises three light sources or the light detector means comprises three light detectors; and
the electronic means for computing, utilizing the light intensity emitting patterns of the light sources and the locations of the light sources relative to the reference line or the light intensity detecting sensitivity patterns of the light detectors and the locations of the light detectors relative to the reference line, a distance from the reference point to a point on a surface of an object located on or substantially on the reference line also computes whether the point on the surface of the object is located on a left or right hand side of the reference line or whether the point on the surface of the object is located on a left or right hand side of the reference line and a distance of the point from the reference line.

17. The method for measuring a distance according to claim 12, wherein:
generating a vibration output with the electronics means through vibration coupling means to be coupled to a user to inform the user of a distance to an object.

18. The method for measuring a distance according to claim 17, wherein:
coupling the vibration coupling means to a wrist of a user to couple the vibration output to a wrist of a user.

19. The method for measuring a distance according to claim 18, further comprising:
detecting when light from the light source means is being reflected to the light detector means by a user's hand with hand occlusion detection means; and
making a user aware of the hand occlusion with a hand occlusion warning means wherein an output to a user is provided when hand occlusion Is detected by the hand occlusion detection means.

20. The method for measuring a distance according to claim 18, further comprising:
computing an estimate of the intensity of light reflected by the hand with hand occlusion detection means and using the estimate to modify the distance determined.

21. The method for measuring a distance according to claim 18, further comprising:
reorienting the light source means or the light detector means by an action of a user to aim at least one of the light sources or at least one of the light detectors toward a desired direction.

* * * * *